Aug. 9, 1949.                R. G. LEITNER                2,478,538
                         SOUND TRANSLATING DEVICE
Filed Sept. 30, 1942                              9 Sheets-Sheet 1
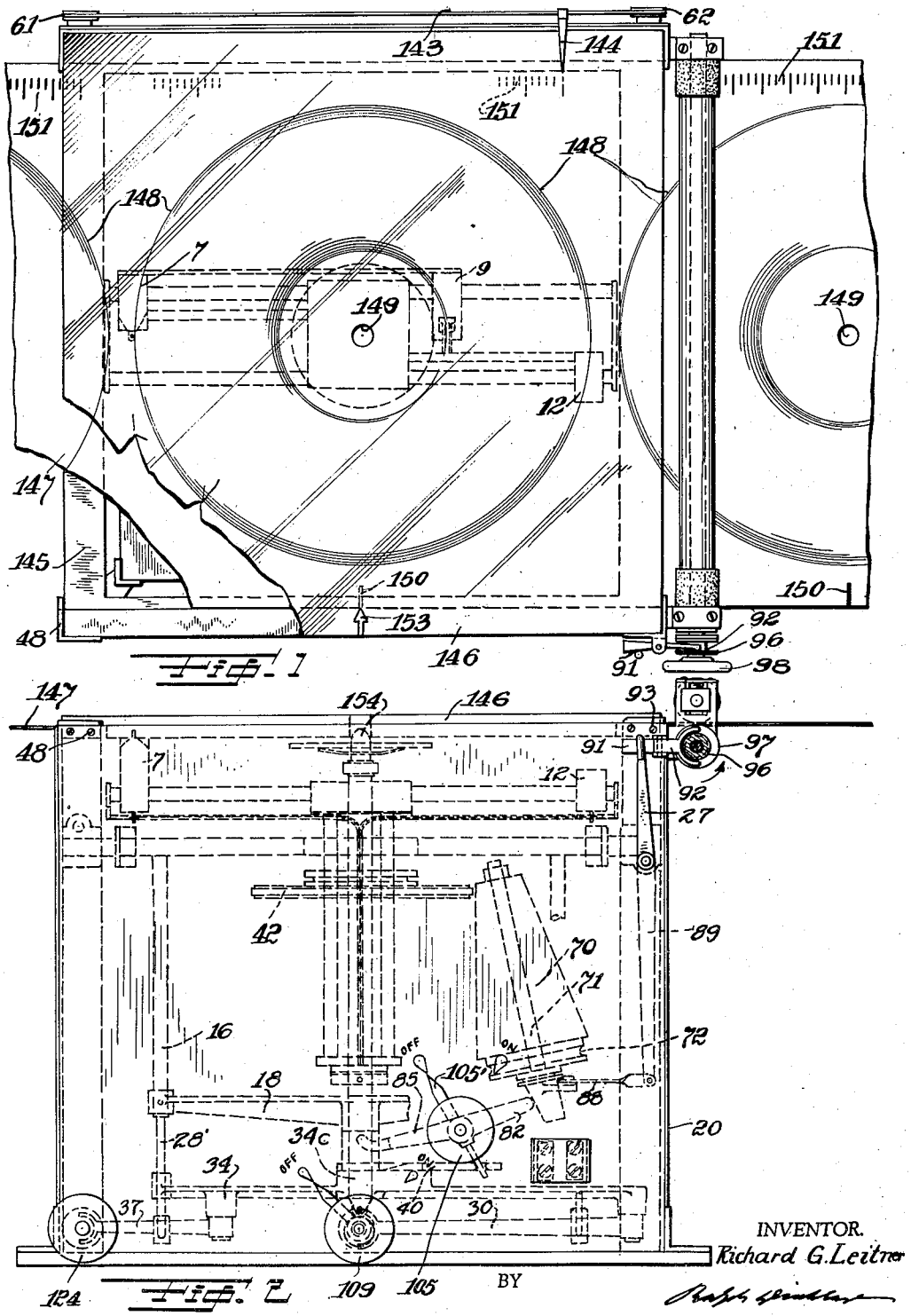
INVENTOR.
Richard G. Leitner
BY
ATTORNEY.

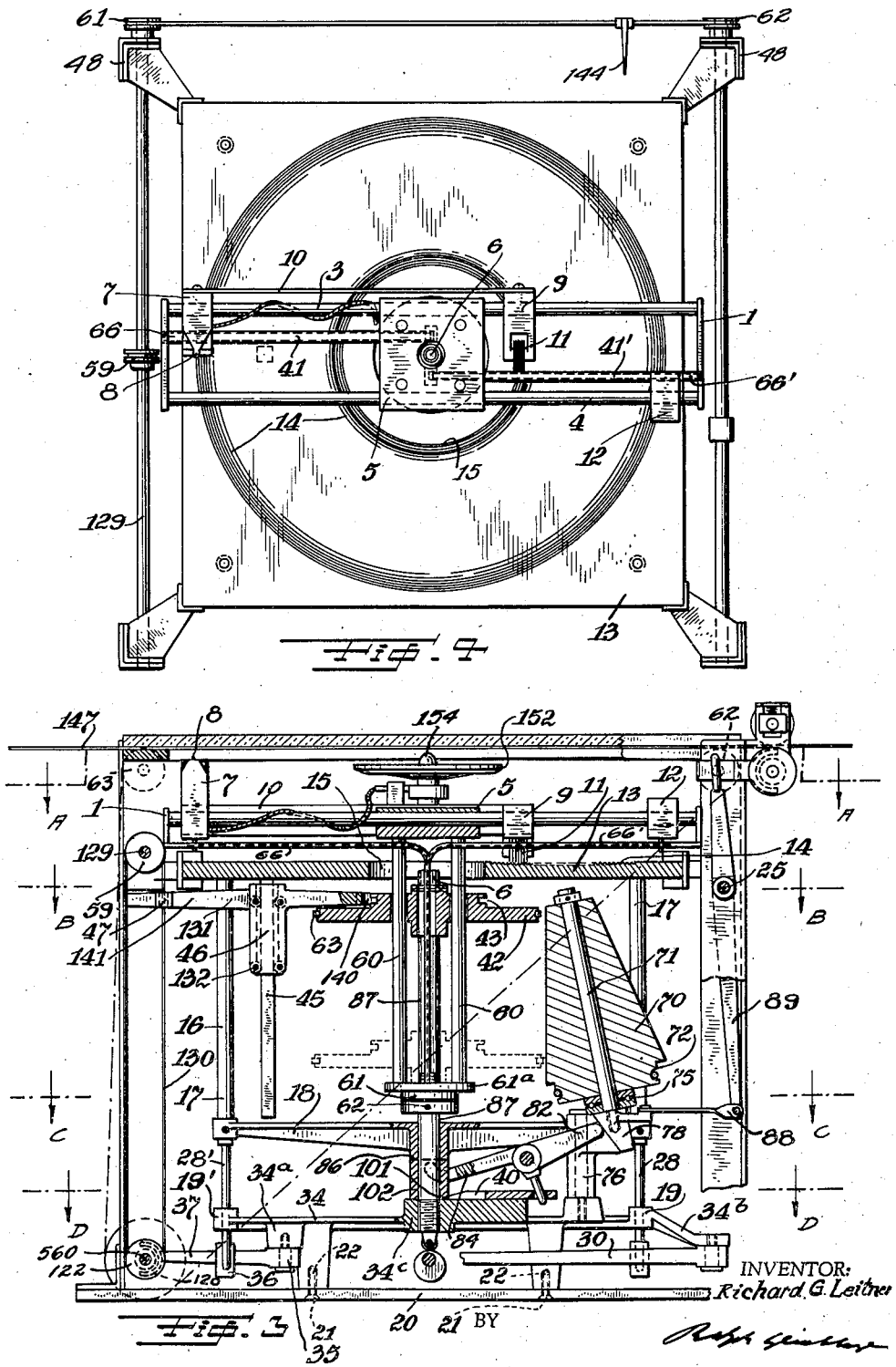

Aug. 9, 1949.    R. G. LEITNER    2,478,538
SOUND TRANSLATING DEVICE
Filed Sept. 30, 1942    9 Sheets-Sheet 3

INVENTOR:
Richard G. Leitner
BY
ATTORNEY.

Aug. 9, 1949.  R. G. LEITNER  2,478,538
SOUND TRANSLATING DEVICE
Filed Sept. 30, 1942  9 Sheets-Sheet 4
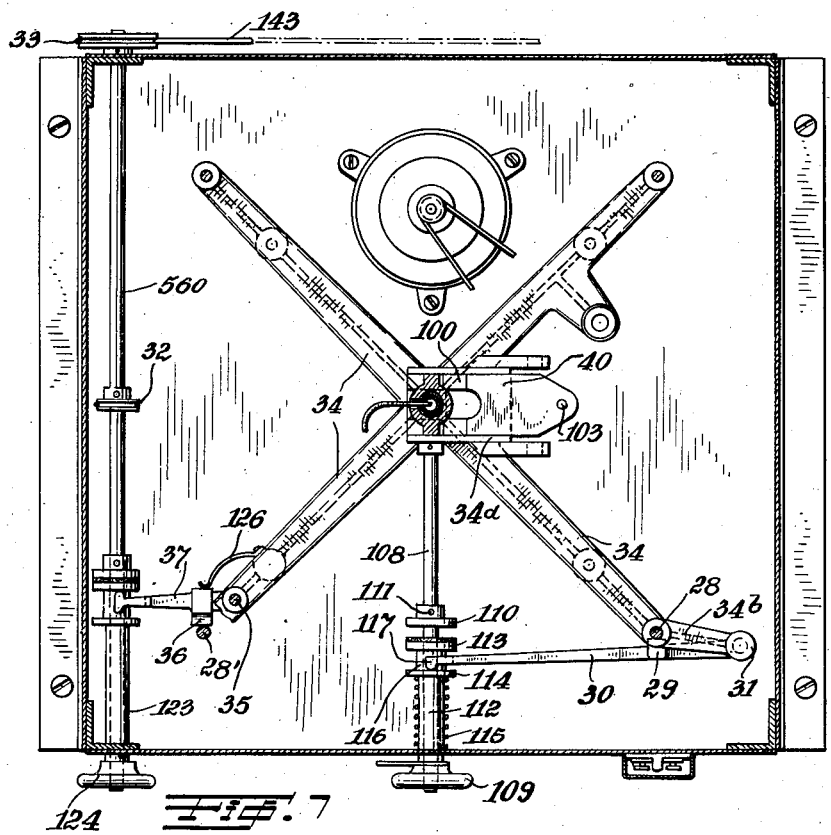
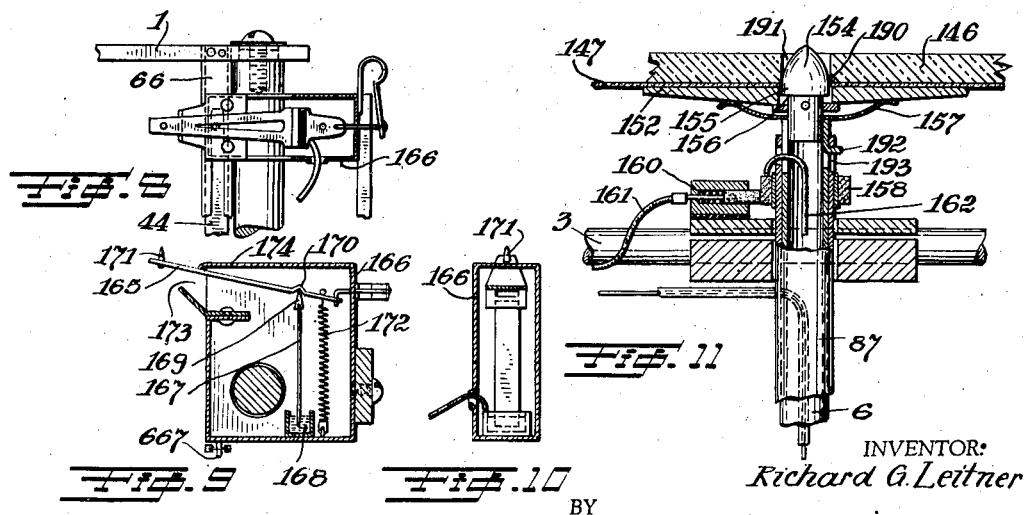
INVENTOR:
Richard G. Leitner
ATTORNEY.

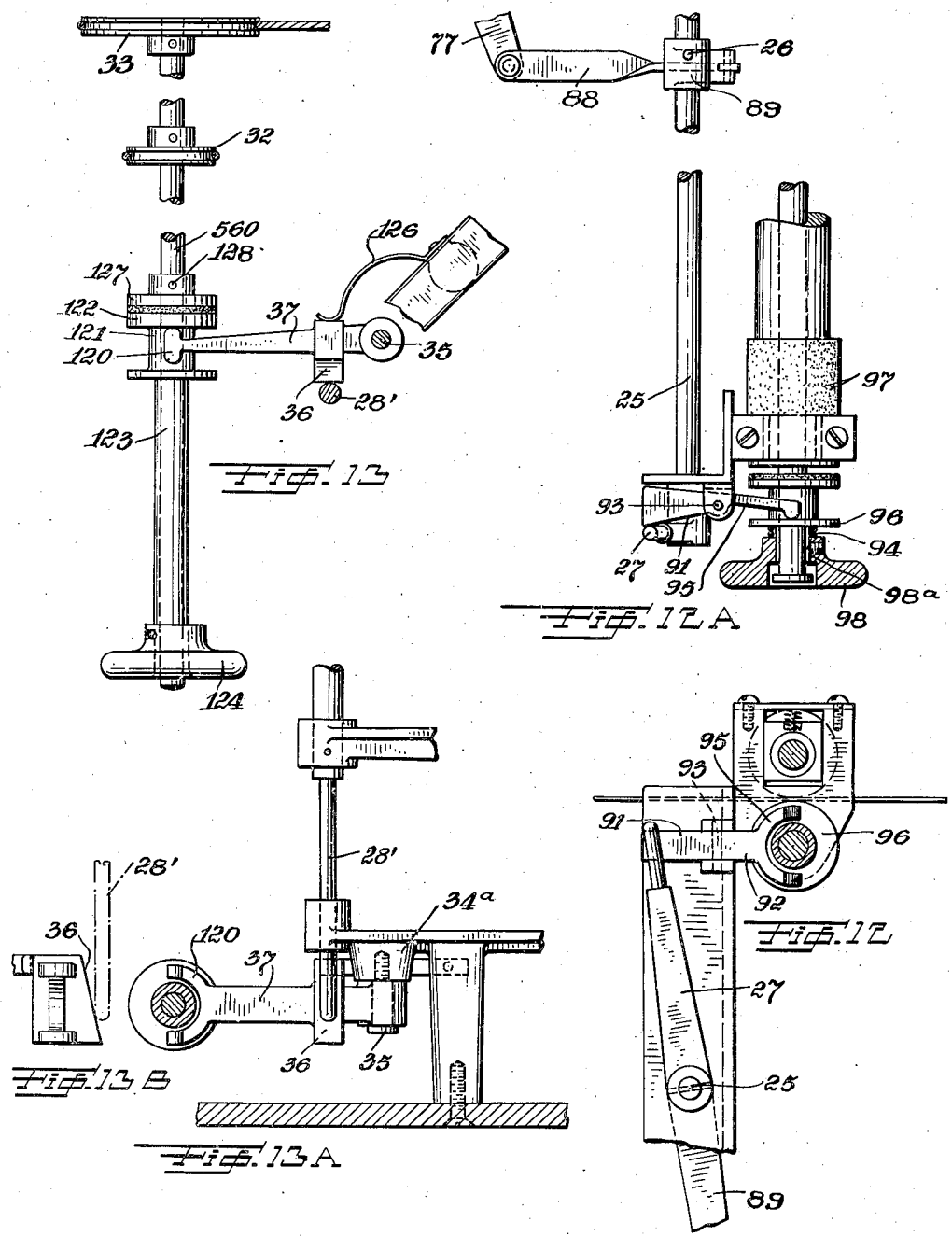

Aug. 9, 1949.   R. G. LEITNER   2,478,538
SOUND TRANSLATING DEVICE
Filed Sept. 30, 1942   9 Sheets-Sheet 6
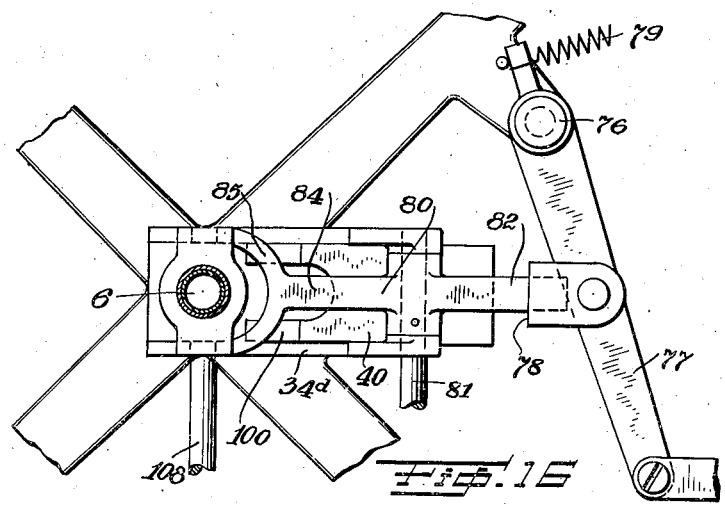
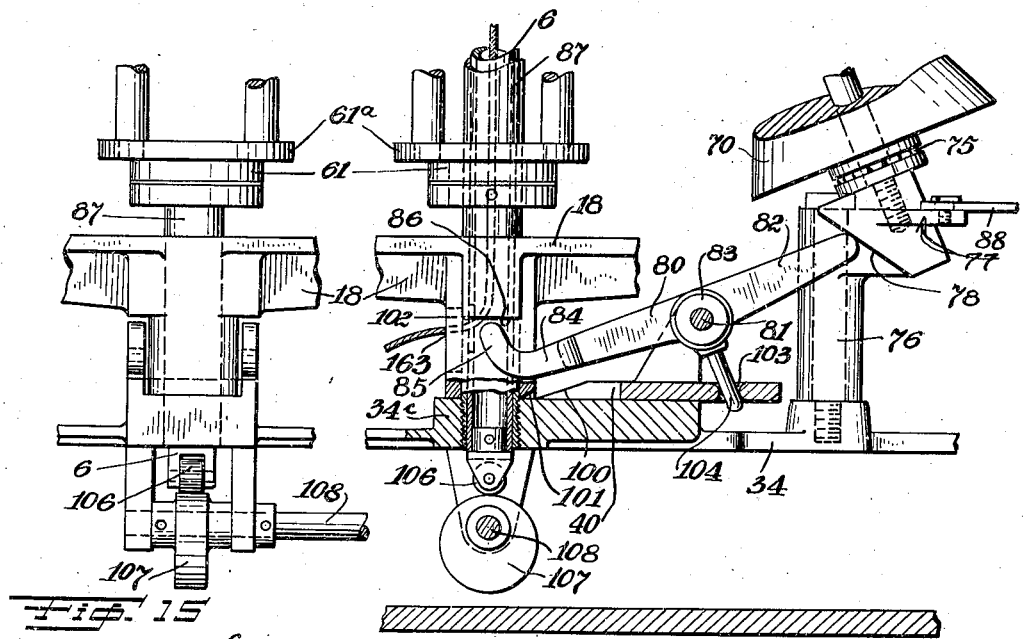
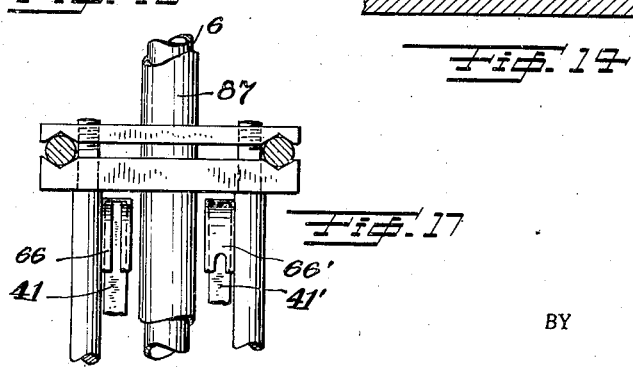
INVENTOR:
Richard G. Leitner
BY
ATTORNEY.

Aug. 9, 1949.  R. G. LEITNER  2,478,538
SOUND TRANSLATING DEVICE
Filed Sept. 30, 1942  9 Sheets-Sheet 7
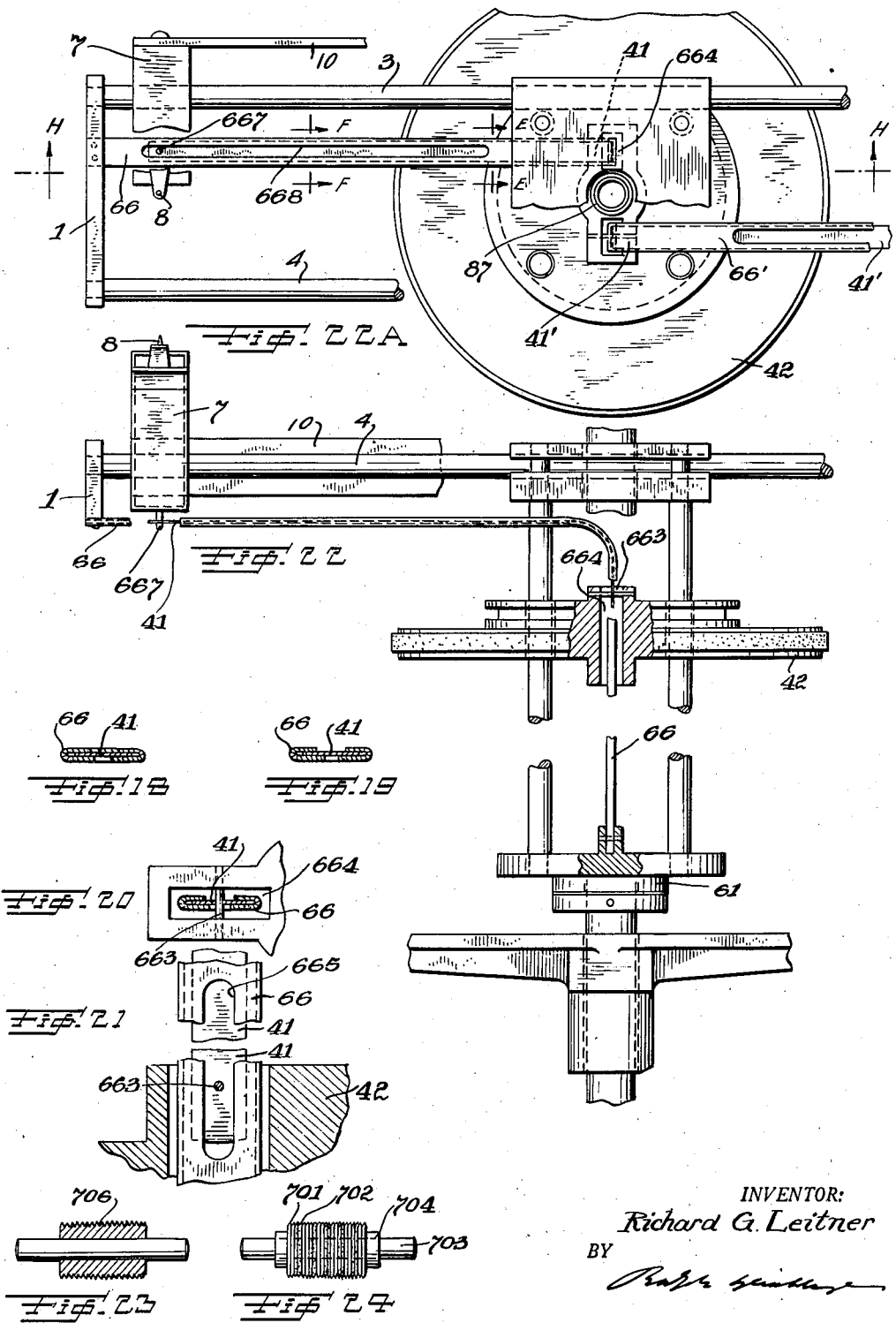
INVENTOR:
Richard G. Leitner
BY
ATTORNEY.

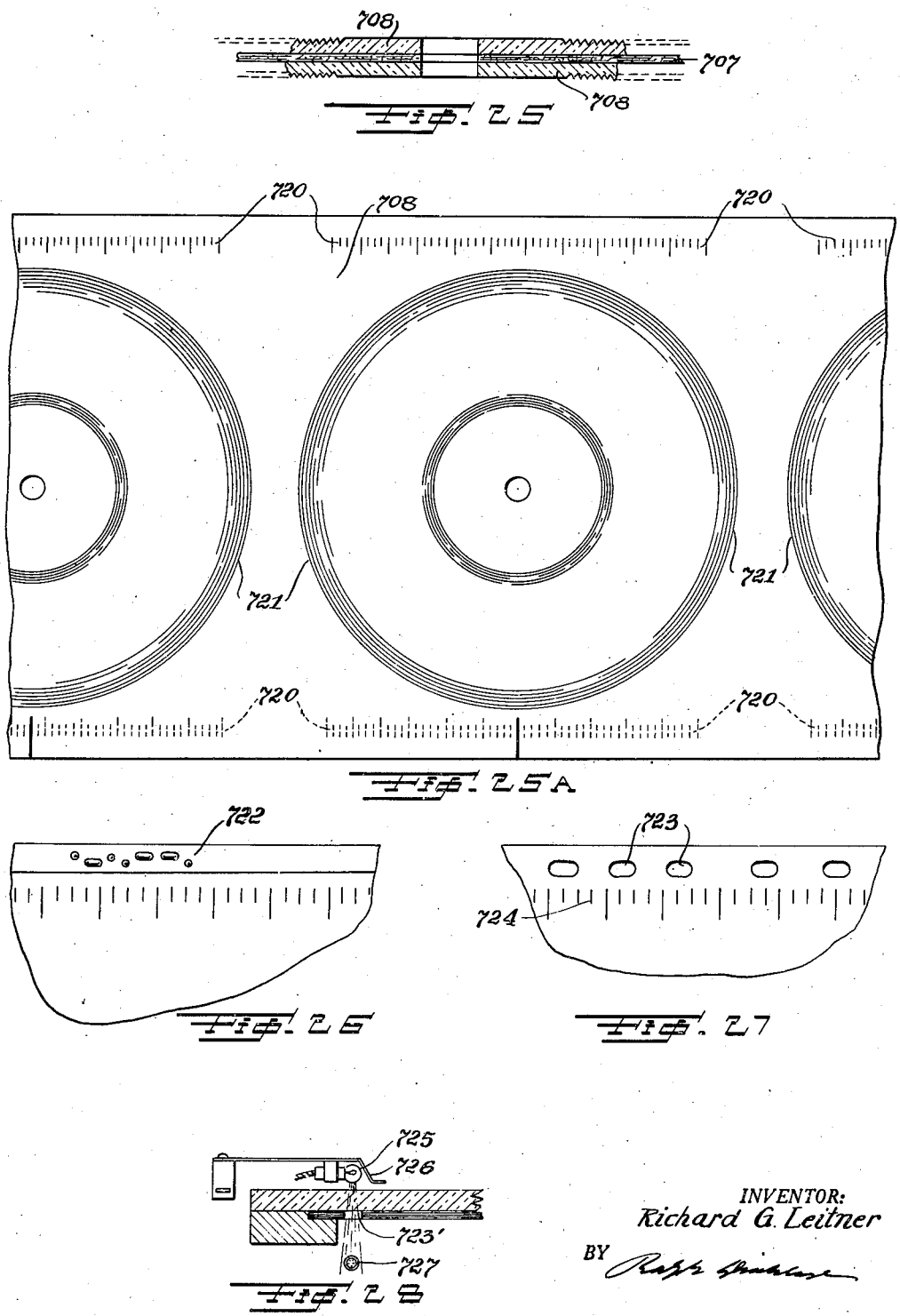

Aug. 9, 1949.　　　　　R. G. LEITNER　　　　　2,478,538
SOUND TRANSLATING DEVICE

Filed Sept. 30, 1942　　　　　　　　　　　　　　9 Sheets-Sheet 9

INVENTOR:
Richard G. Leitner
BY

ATTORNEY.

Patented Aug. 9, 1949

2,478,538

UNITED STATES PATENT OFFICE 2,478,538

SOUND TRANSLATING DEVICE

Richard G. Leitner, Los Angeles, Calif., assignor to Frank Rieber, New York, N. Y.; Lu Garda Rieber executrix of said Frank Rieber, deceased Application September 30, 1942, Serial No. 460,263

8 Claims. (Cl. 274—9)

This invention relates to new and useful improvements in sound translating devices.

One object of the invention comprises, inter alia, a sound translating device having a rotating sound translating stylus head and using a substantially stationary sound record element.

The invention broadly comprises a rotatably mounted sound translating stylus head, including a stylus, movable in radius variation with respect to its axis of rotation, means for holding a sound record element and preferably a sound record element having at least two straight parallel sides, in substantially stationary position adapted for stylus engagement with said stylus head, and means for rotating said stylus head, in stylus engagement with a sound record element so held, along a closely spiralled path.

The construction in accordance with the invention makes it possible to use a stationary record element and to be thus able to read matter printed or written on the same, such as titles, lyrics and/or music, indices, etc. Furthermore, it is possible with such construction to provide for suitable index material, preferably on the record element itself, identifying given points on or sections of the record element and to coordinate the same, by way of a suitable position or progress indicator, with corresponding stylus positions. In this manner the position or positioning of the indicator in registry with a predetermined identifying index mark fixes the stylus position on the record element at the point identified by such mark.

The advantages gained in accordance with my novel construction, relative, for instance, to the provision of index matter referred to, are still further enhanced by the use of a constant groove velocity drive construction which makes it possible to produce a "talking book," i. e., a book or the like recorded in sound reproduceable form. The combination of constant groove velocity drive and stationary sound record element, in accordance with a preferred embodiment of my invention is productive of a cooperative relationship which well adapts the same for such talking books, since it is possible to obtain by such combination a sound reproduceable record element, containing uniformly the largest possible amount of recorded material per available area and capable of detailed topic or the like identification from a suitable and properly coordinated index, for accurate stylus registry or observation of stylus progress.

In one form of my invention, therefore, the same embraces, in cooperation with my rotating sound translating stylus head construction, a constant groove velocity drive and an index or progress indicator mechanism generically comprising an index indicator positioned and adapted to move over index marks arranged and coordinated with a record element so held, to identify sound groove sections thereon, and means cooperatively connecting said indicator and stylus head to move said indicator over such marks in coordination with indicator identifiable groove section progress of said stylus head.

In its preferred form such indicator construction is used in connection with index material, preferably carried on the sound record element itself, having index marks arranged and coordinated with stationary record element to identify sound groove sections thereon in a ratio of linear index sequence to linear groove section sequence in excess of 1:1. In such case the indicator and stylus head are so connected as to move the indicator at a ratio of linear indicator progress to radially linear stylus progress equivalent to the ratio of index groove section sequences referred to.

The invention will be more fully understood and the foregoing and further objects thereof will appear from the following description read in conjunction with the drawings in which:

Fig. 1 represents a top view of a sound translating device in accordance with my invention with parts broken away to show underlying structures;

Fig. 2 illustrates a front view of the structure shown in Fig. 1 exemplifying interlock of parts;

Fig. 3 is a front view of the construction shown in Figs. 1 and 2 with the front broken away and certain parts in cross section;

Fig. 4 is a cross section view of the structure shown in Fig. 3 in the plane A—A thereof;

Fig. 7 is a cross section through Fig. 3 in the plane D—D thereof;

Figs. 8, 9, and 10 represent enlarged top, side and front views respectively of a sound translating stylus element useful in accordance with the invention;

Fig. 11 demonstrates an enlarged view of part of the construction shown in Figs. 1, 2, 3 and 4 illustrating wire connections and centering spud;

Fig. 12 illustrates an enlarged view, partly in cross section, of the record element transporting mechanism and clutch means therefor;

Fig. 12A is a detail of the function roller clutch mechanism;

Fig. 13 represents an enlarged top view of part of the indicator mechanism;

Fig. 13A is a front view, partly in cross section of the construction shown in Fig. 12;

Fig. 13B is a side view of part of the construction shown in Fig. 13A;

Fig. 14 is an enlarged showing of part of the construction shown in Figs. 2 and 3;

Figs. 15 and 16 represent enlarged side and top views respectively of parts of the construction shown in Fig. 14;

Fig. 17 is an enlarged view of part of the construction shown in Figs. 2 and 3 illustrating steel tapes and casings therefore;

Fig. 18 is an enlarged cross section through a tape and casing shown in Fig. 22A in the plane E—E thereof;

Fig. 19 is an enlarged cross section through a tape and casing shown in Fig. 22A in the plane F—F thereof;

Fig. 20 is a top view partly in cross section of a portion of Fig. 22, at right angles thereto, illustrating a tape, casing and slot therefore;

Fig. 21 is a view partly in cross section of a portion of Fig. 22, at right angles thereto, illustrating tape and casing connections for the slide wheel;

Fig. 22 is a cross sectional view, partly broken away, of Fig. 22A in the plane H—H thereof;

Fig. 22A is an enlarged top view, partly broken away, illustrating tape and casing connections;

Fig. 23 represents an enlarged cross section through a scroll plate cooperating roller;

Fig. 24 represents an enlarged cross section through an alternative form of scroll plate cooperating roller;

Fig. 25 is a cross sectional view of a laminated record element with sections broken away;

Fig. 25A illustrates a top view of a record element strip having a plurality of sound grooves;

Fig. 26 is part of a top view of a record element, with sections broken away, showing a braille index;

Fig. 27 is part of a top view of a record element, with sections broken away, showing signal slots; and Fig. 28 demonstrates a cross section of part of the record element shown in Fig. 27 illustrating signal slots, a registering light source and impulse element.

Figure 29:
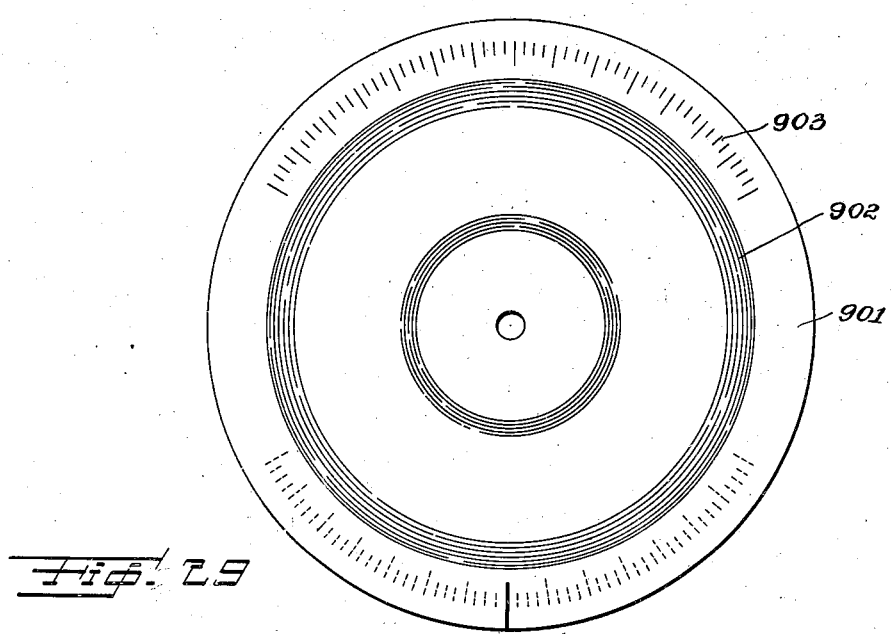
Figure 30:
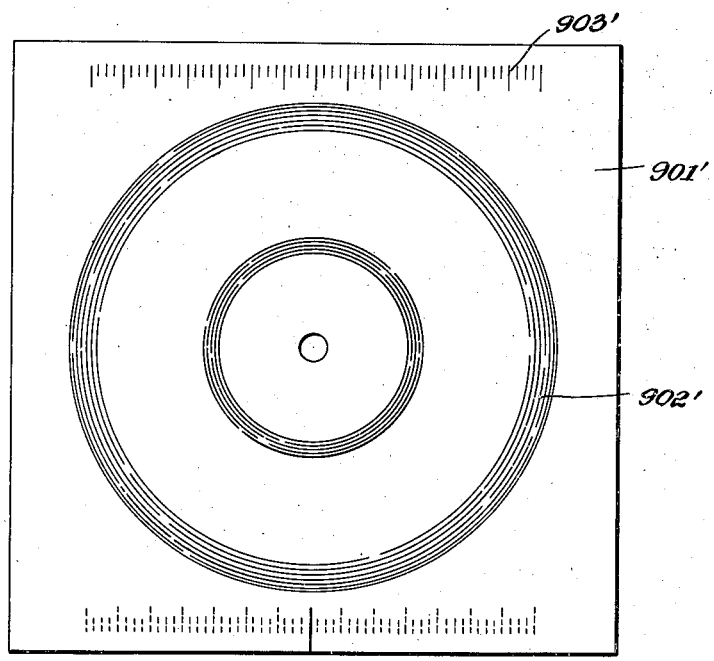

Figs. 29 and 30 are plan views of forms of record that may be used with this device.

Referring to the drawings, (Figs. 3 and 4) 1 indicates a carriage having slide tracks 3 and 4 respectively and rotatably mounted by way of clamp element 5 around stationary hollow shaft 6 axially slidable in sleeve shaft 87 screwed into cross support 34c of chassis 34. Sound translating stylus head 7 is slidably mounted on slide track 3 and tiltable thereon with the stylus 8 facing upwards. Slide element or cam groove follower 9 is slidably mounted on slide track 3 of carriage 1 and connected with stylus element 7 by means of connecting rod 10. Slide element 9 tiltable on slide track 3 carries grooved roller 11. Counter weight 12 adapted to balance stylus element 7 is slidably mounted on slide track 4 of carriage 1. A scroll plate 13, carrying closely spaced spiral grooves 14 and having a center opening 15, is mounted on frame 16 composed of shafts 17 and cross or base member 18. Base member 18 is slidably mounted on sleeve shaft 87. Shafts 17 of frame 16 carry extensions 28 and 28' slidable in guide bushings 19 and 19' secured to chassis 34 attached to the base of housing 20 by means of screws 21 and spacing and positioning lugs 22.

Figure 5:
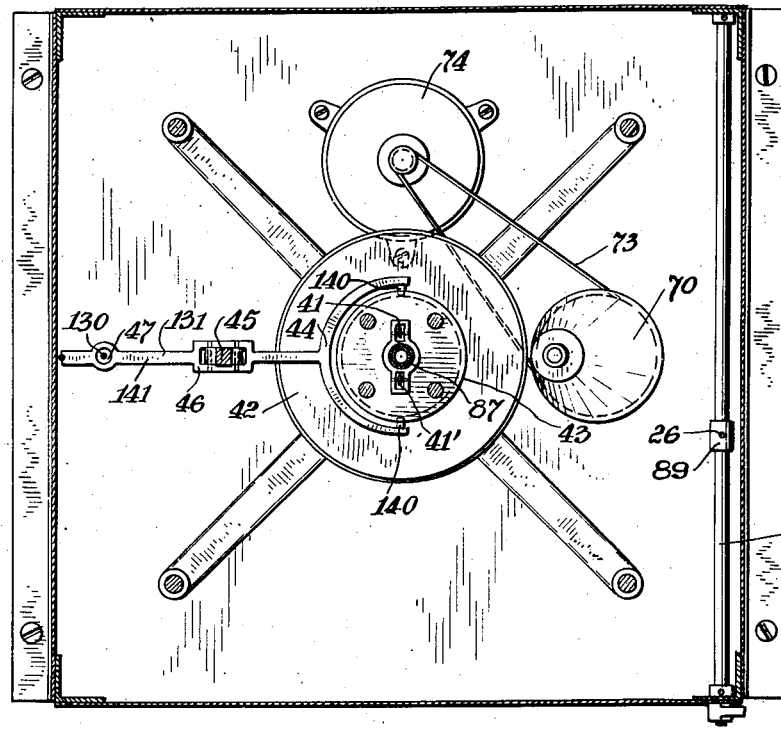
Fig. 5 is a cross section through Fig. 3 in the plane B—B thereof.

Rods 60, carried between clamp element or block 5 and collar 61, secured by means of an anti-friction disc 61a and a set screw or the like 62 to the sleeve 87, extend parallel to and in symmetrically spaced relation around shaft 6 and sleeve 87. Wheel 42, carrying friction rim 63 and upper grooved portion 43, is slidably mounted on sleeve 87 and rods 60 but in rotatable drive relation with rods 60 and thus carriage 1. Flexible tape means such as steel tapes 41 and 41' are attached to friction wheel 42 at diametrically opposed points adjacent shaft 87 (Figs. 5 and 22A), tape 41 being attached with its other end to stylus element 7 and tape 41' to counter weight 12 (Fig. 4). Tapes 41 and 41' slide freely in substantially rigid casings 66 and 66' attached to carriage 1 (Figs. 4, 17 and 22A). As will be seen from Figs. 8, and 18 to 22A inclusive, illustrating the tape and casing connections with respect to the stylus element 8, casing 66, passes through hole or slot 664 in wheel 42 and is suitably secured to collar 61. Steel tape 41 is secured by means of the pin or bolt 663 to wheel 42. Slot 665 in casing 66 permits pin or bolt 663, secured to wheel 42, to slide in casing 66 together with tape 41. Slot 665 is preferably so selected that it delimits with its ends the axial movement of wheel 42. Referring to Figs. 22 and 22A, the upper part of casing 66 is secured to carriage 1. Pin 667 securing tape 41 to stylus head 7, moves in slot 668. As wheel 42 moves down, the stylus head moves towards its axis of rotation and as wheel 42 moves up, the stylus element moves away from its axis of rotation. The same operating mechanism described for coordination of stylus head and wheel positions is used for coordination of counter weight position and wheel position; in this case the pin moving in the tape slot secures the tape to the counter weight. As the tape and casing arrangement 41, 66 is substantially congruous to the tape and casing arrangement 41', 66', the weight 12 will always substantially assume the same position with respect to the axis of rotation of carriage 1 as the stylus head 8.

Cone 70, rotatably mounted on inclined shaft 71, presents a surface line, adjacent friction wheel 42, substantially parallel to the axis of shafts 6 and 87 (Figs. 2 and 3). Pulley 72 on cone 70 is connected by means of the belt or the like 73 to motor 74 (Figs. 5 and 6), ball bearing mount 75 facilitating rotation (Figs. 3 and 14). Referring to Figs. 3, 6, 14 and 16, cone 70 is carried by arm 77, pivotally mounted on stud 76 secured to chassis 34. Arm 77 is provided with cam surface 78 and is pivotable on stud 76 against the force of spring 79. Double arm lever 80, pivotally mounted at 83 on shaft 81, is adapted to engage with its lever arm 82, cam surface 78; lever arm 84 carries fork extensions 85 adapted to engage undersurface 86 of frame member 18, slidably mounted on sleeve 87.

Figure 6:
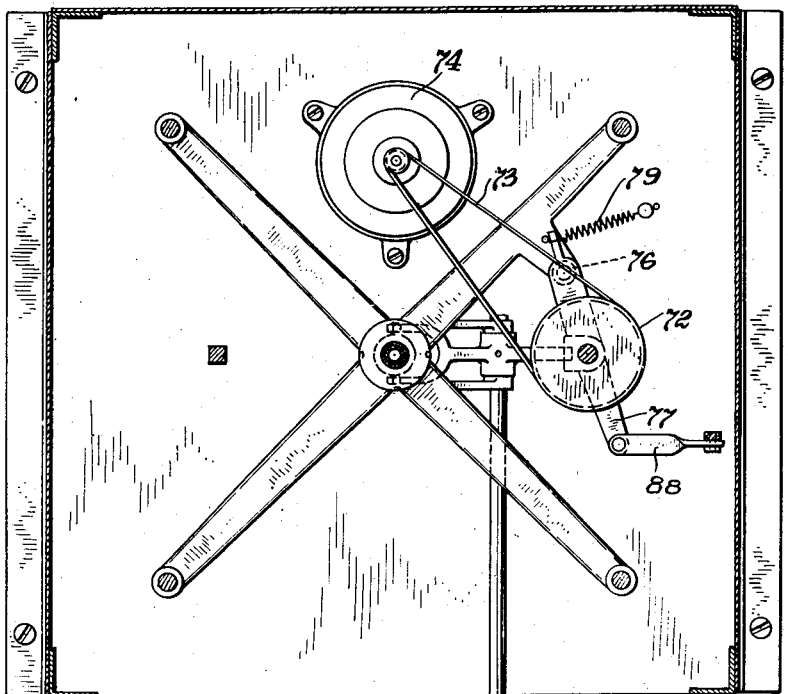
Fig. 6 is a cross section through Fig. 3 in the plane C—C thereof.

Cone arm 77 carries, pivotally attached adjacent its end, arm 88 which is in turn pivotally secured to crank rod 89 attached to shaft 25 by means of the set screw or the like 26 (Figs. 3 and 6). Shaft 25 carries secured thereto crank rod 27 engaging adjacent its end cam surface 91 (Figs. 12 and 12A) of forked lever 92, pivoted at 93 and adapted to engage with its fork ends 95 clutch disc 96 against the force of spring 94. The pair of friction rollers 97 (Fig. 3) are in rotatable drive relation to manual control knob 98 (Figs. 2 and 12A), when clutch disc 96 is in the engaged position, by way of sleeve 98a and clutch disc 96.

Forked member 40 (Figs. 3, 7 and 16) is slidably mounted in frame 34d on part of 34c of chassis 34 and carries the cam surfaced forked ends 100 adapted to engage the undersurface 101 (Fig. 3) of the slide bushing 102 of cross frame 18. Slot 103 (Fig. 14) in forked member 40 engages the pin or rod 104 carried by arm 89 substantially radial to the center of shaft 81 having manual control knob 105 (Figs. 2 and 6).

Stationary hollow center shaft 6 (Figs. 14 and 16) is provided at its lower end with a cam surface or roller 106 positioned to be engaged by the cam 107 carried by shaft 108. Shaft 108 carries disc 110 (Fig. 7), secured thereto by set screw 111 and turns freely inside sleeve 112 carrying manual control knob 109. Sleeve 112 is provided with friction clutch disc 113, rotatable with and axially slidable on sleeve 112, engaging with its shoulder 114 spring 115 mounted to bring discs 110 and 113 into clutching engagement. Grooved portion 116 of friction clutch disc 113 is engaged by the forked ends 117 of forked lever arm 30 carrying cam surface 29 positioned to be engaged by shaft 28 and pivotally connected at 31 to the extension 34b of chassis 34.

As illustrated in Figs. 3, 7, 13, 13A and 13B, forked lever arm 37 carrying cam surface 36, positioned to be engaged by the lower end of shaft 28', is pivotally attached at 35 to the extension 34a of chassis 34. Forked ends 120 of arm 37 engage the grooved portion 121 of friction clutch disc 122, mounted rotatably with and axially slidable on sleeve 123 carrying manual control knob 124. Arm 37 forces clutch disc 122 against the force of spring 126, into engagement with disc 127 when extension 28' engages cam surface 36. Disc 127 is connected by set screw or the like 128 to shaft 560, mounted to freely rotate inside sleeve 123. Shaft 560 carries rotatable therewith shaft pulleys 32 and 33. Shaft 129 (Figs. 3 and 4) mounted in the upper part of the device, substantially parallel to shaft 560, carries pulley 59 in substantial registry with pulley 32 of shaft 560. Belt, or chain 130 (Fig. 3) passes in endless fashion over pulleys 32 and 59. T-arm 131, slidably mounted with its center portion 46 by way of rollers 132 on square shaft 45, engages with prongs 140 of forked portion 44 the grooved portion 43 of the friction wheel 42. Arm portion 141 of T-arm 131 is provided with a slot or hole 47 permitting one side of belt or chain 130 to pass through. The other side of the belt or chain 130 is attached to adjacent the end of section 141 of T-arm 131. Belt or chain 143 passes in endless fashion over pulleys 61, 62 and 33 (Figs. 1 and 7). The portion of the belt or chain extending between pulleys 61 and 62 carries indicator point 144. The ratio of the diameter of pulley 33 to that of pulley 32 is preferably so selected that the indicator 144 is moved in its travel between the pulleys 61 and 62 a comparatively large distance with a relatively small turn of the pulley 33, as for instance at a ratio of 2:1 or 3:1.

Frame 145 (Figs. 1 and 2) is suitably attached to the case of housing 20 such as by angle brackets 48 adjacent the top of the structure. A cover preferably of transparent material 146 fits over frame 145 leaving a space to receive record material. The cover is preferably held in position by the portions of angle brackets 48 extending above frame 145 on housing 20. Frame 145 serves as support for record material 147, which in the embodiment shown (Fig. 1) comprises a strip of successive individual record materials each having its individual spirally arranged sound groove 148, its individual centering aperture 149 and its center point indicator 150. Each individual portion may carry at the margin thereof, a suitable legend or index 151 with which the indicator point 144 may be brought into registry. Stylus positions relative given points on or sections of the record sound groove are coordinated with indicator positions in registry with identifying index marks. Stylus position or progress on the sound groove is thus ascertainable at any time from indicator position or progress on the index. Suitable arrangement for viewing the index should be made such as by way of a cover at least partly composed of transparent material.

Cover 146 cooperates with the frame and disc member 152 (Figs. 3 and 11) to properly support the record material. Frame 145 and cover 146 are so spaced as to permit the record material 147 to pass therebetween without the necessity of lifting the cover. If desired, latch means (not shown) may be used to secure cover 146. Signal mark 153 (Fig. 1) is provided on the cover 146 to indicate centered position of record material when in registry with the center point mark 150.

The scroll plate 13 is preferably secured and positioned in axially slidable arrangement by means of the guide brackets 49.

Hollow shaft 6 (Figs. 3 and 11) carries centering spud 154 fitting with its shoulder portion 155 into recess 156 of disc 152, secured to the sleeve 81 by means of spring element 157. Disc 152 is slidable with respect to shaft 6 and spud 154 against the force of spring 157. Sleeve 87 carries collector ring 158 engaged by the silver graphite brush 159 held in contact with the collector ring by the spring 160 and connected to the sound translating stylus element by the wire lead 161 wound around slide track 3. Wire lead 162 attached to collector ring 158 passes through registering slots in sleeve 87 and hollow shaft 6, thence through hollow shaft 6 emerging adjacent the base thereof at 163.

Specifically referring to Figs. 8, 9, and 10, a sound reproducing stylus element, useful in accordance with the invention, is exemplified. Mounted in casing 166 is a piezo-electric crystal 167 preferably set in rubber 168 and supporting with its wedge-shaped point 169, in a suitable V-shaped indentation 170, the stylus arm 165, carrying the stylus 171. The shorter end of arm 165 is attached to spring 172 secured to the housing 166, the upper lip 174 of the aperture 173 of the housing 166 serving as a stop for arm 165.

The spiral grooves 14 (Figs. 3 and 4) on scroll plate 13 are preferably provided in dimensional simulation of a spiral phonographic record sound groove. Roller 11 designed to cooperate with scroll plate 13 is preferably a small roller carrying circumferential grooves providing ridges adapted to engage or track in the grooves 14 on the scroll plate 13. Both the grooves on the scroll plate and the grooves on the cooperating roller are preferably made in buttress form adapted to exert radial pressure in the direction in which the radius is to be extended or reduced as the case may be without developing any large component of pressure tending to force grooved roller out of the grooves in the scroll plate. The scroll plate, in accordance with my invention, may be conveniently molded from a suitable plastic material and preferably a thermo-plastic material such as a suitable Vinylite, Bakelite, or the like, the molding of such grooves presenting no more difficulty than the molding of grooves in the ordinary phonographic record. Alternatively, if desired, suitable scroll plates may be made in any other suitable manner such as by precision etching or engraving or the like.

As a scroll plate cooperating roller, in accordance with my invention, I prefer to use a hard polished steel roller. A plurality of grooves 706 (Fig. 23) may be placed on the roller face to produce a plurality of ridges adapted to engage corresponding grooves in the scroll plate. By the use of a plurality number of grooves or ridges a greater total strength is provided for the driving mechanism although it is recognized that all of the engaging surfaces do not travel at identical speeds, and that therefore slippage between some of the grooves must occur. With a finely grooved scroll plate, however, and a finely grooved or ridged cooperating roller, 5 or more grooves may be engaged substantially without producing slippage or irregularities in the drive guiding the radial movement of the sound translating stylus.

As an alternative to the simple form of grooved steel roller just mentioned, I may employ a laminated roller consisting of alternate discs of steel 701 (Fig. 24) and of resilient material such as synthetic rubber 702, all mounted on a common shaft 703 which serves as axis of revolution of the roller. These discs are all clamped tightly together by two cooperating cheeks 704 mounted on this axis and of diameters slightly smaller than the steel and rubber discs. This disc assembly is suitably provided with grooved or ridged surface 705 adapted to cooperate with the grooves on the scroll plate. Such a laminated roller has the advantage of cooperating more accurately with the grooves on the scroll plate since the resilient material between the successive discs yields slightly and thus distributes the pressure load between the discs instead of permitting it to fall upon one disc alone, in the event of slight irregularities in the scroll plate.

The device in accordance with my invention, as is common with sound translating mechanisms known to the art, may be used both for the preparation of the record as well as for the reproduction of sound from a record already made. In many cases, as is for instance conventional in the art, increased pressure of the stylus on the record material will produce a sound groove while the same stylus permitted to pass through the previously made groove at reduced pressure will reproduce the sound of that groove. The same stylus head that is used for recording need not be used for reproduction. Where reference, therefore, is made herein to the term "sound record element" or such similar expression, the same is used in its broadest sense and intended to include in a proper case a sound record element adapted to receive a sound groove as well as a sound record element already containing a sound groove and adapted for reproduction of sound therefrom.

Although a strip of successive units of record material has been illustrated in connection with the construction exemplified by way of preferred embodiment in the drawings, it is possible to use individual pieces of record material and irrespective of their particular geometrical configuration. If substantially circular record material is used, a suitable modification of the frame may be necessary, within the skill of the artisan, to firmly hold the record material in place. I prefer, however, to use the square form of record material as the same offers many advantages not realized with other forms of record material.

In its preferred form (Figs. 25 and 25A), the record may be laminated having a center strip of preferably non-transparent material such as the paper strip 707 adapted to receive a suitable printed legend, such as a table of contents, a visual index or the like 720. Covering this center strip on each side, and suitably secured or bonded thereto, is a thin layer of plastic material preferably relatively thin sheet material 708, adapted to receive a sound reproduceable groove of either lateral or vertical cut type 721. This plastic material is preferably transparent. Consequently one surface of the plastic may serve as a protection for the printed visual legend while the other surface receives sound impressions. If desired, however, sound impressions may be carried on both surfaces, and visual index or the like material may be printed on both sides of the center strip. The visual legend material may extend to portions covered by sheet material carrying sound grooves since the sound grooves do not obscure plainly printed index material.

As supplement to the visual index and particularly for use by the blind, I may extend one edge of the record strip (Fig. 26) and provide thereon braille index marks 722. It is further possible to provide (Figs. 27 and 28) suitable signal slots or marks 723 coordinated with given index marks 724 and this with given indicator coordinated stylus positions to actuate any desired mechanism. As for instance illustrated in Fig. 28, the light source 725 secured to and moving with indicator 726 incites, when in registry with signal slot 723', the selenium or impulse element 727 thereby closing an electric circuit (not shown) to effect for example slide changing in a projection machine.

By way of simplification but not of limitation, the hereinafter following description of the practical operation of my invention is made in connection with record material adapted to be translated into sound from a sound groove previously recorded.

In the practical operation of my invention, and assuming the manual control knob 105 to register with its index finger the "off" position (Fig. 2), a strip of record material is threaded by way of the friction rolls 97 into the space defined between frame 145 and the rim of cover 146. This is accomplished by turning the manual control knob 98 in the direction of the arrow; clutch disc 96 (Figs. 3, 12 and 12A) is in the engaged position as rod 27 is in a position with respect to the cam surface 91 in which the forked portion 95 forces clutch disc 96 into clutch engagement so as to establish direct drive relation between control knob 98 and friction roller 97. Rotation of control knob 98 is continued until centerpoint mark 150 on the record is substantially in registry with signal mark 153 on cover 146.

The relative position of parts with control knob 105 in the "off" position will be substantially noted as follows: The scroll plate 13 (Fig. 3) is down and out of engagement with roller 11 of slide element 9. Stylus 8 of sound translating head 7 is out of engagement with the sound record material. Shaft 6 and sleeve 87 are in a substantially lowered position. Shaft extension 28 engages cam surface 29 (Fig. 7) thereby swinging arm 30 frontwards thus holding clutch disc 113 out of engaging position with disc 110 on shaft 108 whereby the direct drive connection between control knob 109 and shaft 108 is released. Shaft extension 28' (Figs. 7 and 13) engages cam surface 36 thereby swinging arm 37 back and thus the clutch disc 122 into engagement with the disc 127 whereby direct drive connection between the control knob 124, sleeve 123 and shaft 60 is established. Forked arm 84 (Figs. 6 and 14) of double lever arm 80 is lowered while arm portion 82 is on the upper portion of the inclined face 78 of the cone base 77 thereby swinging cone 70 around its pivot point 76 against the force of spring 79 away from the engagement with the friction wheel 42, this pivoting motion at the same time securing drive connection between friction rolls 97 and control knob 96, as previously described, by way of the rods 88, 89 and 27 and the wedge arm 92, pivoting at 93 (Figs. 3, 12 and 12A).

As the next step in the operation of the device, the stylus is positioned with respect to any particular desired point of registry with the sound groove on the record 147. This is accomplished by turning control knob 124 (Fig. 13) which, being in clutched drive relation to shaft 60 and pulley 32, will rotate the endless belt 130 by way of pulley 59, at the same time rotating pulleys 53, 61 and 62 by way of belt 143 (Fig. 3). Assuming the record material to be one on which sound reproduction is to proceed from outwardly to inwardly on the spiral sound groove, the T-arm 131 in its highest position will correspond to the highest position of friction wheel 42 and in its lowest position to the lowest position of friction wheel 42. Friction wheel 42 is connected to stylus element 7 on carriage 1 by steel tape 41, slidable in tape casing 66, in such manner that the highest and lowest positions of friction wheel 42, with respect to the surface of cone 70, correspond respectively to positions of greatest and least radial extension of the sound translating stylus element 7.

The index or other legend indicator 144 is preferably so set that its zero mark corresponds to the outermost position of the sound translating stylus element. By turning control knob 124, the index indicator 144 may be set to any desired position between the outermost and innermost positions of the stylus element, i. e., to any given intermediate index point, predetermined for a particular sound groove relation, and the positioning of the index 144 will automatically adjust the stylus of stylus element 7 to that position.

After the index pointer has been set to the desired position, i. e., in the illustration of the drawings the zero position (Fig. 1) corresponding to the outermost stylus element position, the control lever 105 (Fig. 2) is turned with the marker 105' to the "on" position. Arm 82 (Figs. 3 and 14) slides down cam surface 78 of base 77 of cone 70 thereby causing spring 79 (Figs. 6 and 16) to pivot cone 70 towards and into engagement with the rim 63 of friction wheel 42 (Fig. 3). At the same time, by way of rods 88, 89 and crank 27, clutch disc 96 (Fig. 12A) is moved out of clutching engagement thereby breaking the direct drive relation between control knob 98 and friction rollers 97 so that in this position the strip of record material cannot be moved by accidental turning of control knob 98. As arm 82 (Figs. 3 and 14) moves downwardly on the inclined surface of the cone base, the forked portions 85 of arm 84 engage surface 86 of the cross frame 18 lifting the same, at the same time sliding forked member 40, by way of the pin 104 and slot 103, under the sleeve 102, which is slidably mounted on sleeve member 87, surrounding hollow shaft 6. Slide member 40 thereby engages, with the inclined fork portions 100, the under-surface 101 of the sliding bushing 102 so as to lock cross frame 18 of the frame 16 into position. When raising cross frame member 18, scroll plate 13, carried by frame 16, is commensurately raised into engaging position between the groove 11 on the scroll plate 13 and the grooved roller 14 carried by the slide member 9 (Fig. 3). As the scroll plate engages the grooved roller, the latter is pushed upwardly thus tilting slide member 9 on its slide track and thereby tilting the stylus element into stylus engagement with the record. In the position shown, the sound translating stylus element is in its outermost position while the scroll plate cooperating roller 14 is in its innermost position.

The raising of frame 16 and thus of the scroll plate 13 moves the frame extensions 28' and 28, which are preferably of smaller diameter than the frame portions 17, out of contact with the respective cam surfaces 36 and 29 (Fig. 7). In this manner, arm 30 swings backward thereby moving, aided by spring 112, the clutch disc 113 into clutching position with disc 110 to thereby establish direct drive connection between the control knob 109 and shaft 108 by way of the sleeve 112, friction clutch 113 and disc 110. At the same time, arm 37, controlled by spring 126, moves disc 122 away from the disc 127 thereby breaking the direct drive connection between shaft 60 and the control knob 124. This arrangement prevents movement of the stylus element, while in record engagement, by accidental turning of the control knob 124.

As afore related, with control knob 105 (Fig. 2) in the "on" position, control knob 109 (Fig. 7) is in direct drive relation to shaft 108. Turning of control knob 109 and thus of shaft 108 (Figs. 3, 14 and 15) will cause cam element 107, engaging the roll 106 at the lower end of shaft 6, to raise shaft 6, thereby pushing the upper end or spud 154 (Fig. 11) of shaft 6 through the center hole 190 of the record material 147 and partly into and in registry with the aperture 191 of cover 146. In this manner, the record material is more accurately centered than is possible by index registry alone between marks 150 and 153. Projection 192 on shaft 6 and slidable in slot 193 of sleeve 87 delimits the movement of shaft 6. Projection 192 serves to control movement of shaft 6 with respect to sleeve 87 and may also serve to actuate a contact switch (not shown) when in its highest position, i. e., a position at which the centering spud 154 has brought the apertures of cover and of record material into substantially accurate registry with plate 152 which firmly holds the record material against cover 145 by means of spring element 157. This contact switch (not illustrated) serves to switch on motor 74 (Fig. 6) to drive cone 70 by means of the belt 73 and cone pulley 72. Alternatively a separate motor switch may be provided to be manually operated when all other elements are in their proper operating relation.

As the driven cone rotates, it engages the friction rim, (Figs. 3 and 5), such as rubber rim 63, of friction wheel 42 by frictional contact with the cone surface. Friction wheel 42 and rods 60 thus rotate together with carriage 1. As carriage 1 rotates, the cooperating roller 14 passes in groove engagement with the grooves 11 of scroll plate 13 and stylus 8 of sound translating stylus head 7 travels along the spiral sound groove of the record element 147. These outwardly spiraling grooves 11 cause the cooperating roller 14 and thus slide element 9 to move in a radially extending spiral path, while the stylus element moves in a radially decreasing spiral path. As stylus 8 moves in radius diminution, steel tape 41, held longitudinally substantially rigid by the rigid casing 66, causes rotating wheel 42 to slide downwardly to progressively increasing cone diameter positions. Steel tape 41', held longitudinally substantially rigid by the rigid casing 66', will commensurately move the counter weight 12 in continuous position of balance with the moving stylus head 7.

The circumference of the friction disc 42 and the dimensions, including pitch, of the cone surface are so selected that the stylus 8 of the sound stylus translating element 7 travels in any given time interval substantially the same linear extent of groove regardless of the radial position of the stylus. Thus, when the stylus traverses the larger spirals, the frictional engagement between the wheel 42 and the cone surface is at the smaller end of the cone and as the stylus traverses grooves of lesser radius, the wheel 42 is in frictional engagement with a larger circumferenced cone surface, finally arriving, as shown in the dotted position, in driving engagement with the base of the cone at a point where the stylus traverses spirals of minimum radius. By the use of this constant groove velocity principle, I am able to utilize almost the entire area of the record element, reproducing from any portion thereof, sound of a quality and fidelity identical with that reproduced from any other part of the record element.

Though the device in the illustration herein used is exemplified as one operating from maximum to minimum radial position, it is of course understood that the same may be used by drive directional reversal, such as by belt crossing in connection with record material in which the stylus element rotates in spirally outwardly extending engagement.

The foregoing description is for purposes of illustration and not of limitation, and the same is not to be limited except by the appended claims in which I have endeavored to claim broadly all inherent novelty.

The subject matter herein disclosed but not claimed forms the subject-matter of copending applications 460,264 and 460,265 filed September 30, 1942 and 472,792 filed January 18, 1943.

I claim:

1. A sound translating device adapted for use with a record having a spiral sound track thereon comprising in combination stationary means for supporting a sound record in a stationary inverted position, an arm mounted below said record carrying a stylus movable thereon toward and from the axis of the record position having means for engaging the stylus with the sound track of the record, means for effecting a limited relative motion between said stylus and the record to bring the stylus into and out of engagement with the sound track, means for rotating said arm about the axis, and means also situated below said record for coordinating the rotation of the arm with the inward movement of the stylus to cause the latter to follow the sound track of the record.

2. A sound translating device adapted for use with a record having a spiral sound track thereon comprising in combination stationary means for supporting said sound record in a stationary inverted position, an arm mounted below said record carrying a stylus movable thereon toward and from the axis of the record position having means for engaging the stylus with the sound track of the record, means for rotating said arm about the axis and means for coordinating the rotation of the arm with the inward movement of the stylus to cause the latter to follow the sound track of the record, comprising a stationary disc having a spiral groove therein, a follower rotatable with said arm, and movable in said groove, means connecting said follower with said stylus whereby the stylus is constrained to move in a path identical with the sound track on said record.

3. A sound translating device comprising a member over which a record may be fed horizontally from the side to a playing position, supporting means movable from below to engage said record when the latter is in registering position and to support the same at the center, an arm situated below said record carrying a stylus movable toward and from the axis of said record position means for rotating said arm and stylus about the axis of the record position, means for moving said stylus from a point where it will clear said record to a point where it will engage the sound track on said record, and means also situated below said record for coordinating the toward movement of the stylus and the rotation of the arm, to constrain the stylus to a movement in a spiral identical with the spiral of the sound track of said record.

4. A sound translating device comprising a member over which a record may be fed horizontally from the side, to a playing position supporting means movable from below to engage said record when the latter is in registering position and to support the same at the center, an arm situated below said record carrying a stylus movable toward and from the axis of said record position, means for rotating said arm and stylus about the axis of the record position, means for moving said stylus from a point where it will clear said record to a point where it will engage the sound track on said record, and means for coordinating the toward movement of the stylus and the rotation of the arm to constrain the stylus to a movement in a spiral identical with the spiral of the sound track of said record, comprising a stationary disc having a spiral groove therein, a follower rotatable with said arm, and movable in said groove situated diametrically opposite to said stylus about said axis, means connecting said follower with said stylus whereby the stylus is constrained to move in a path identical with the sound track on said record.

5. A sound translating device comprising a member over which a record may be fed horizontally from the side, supporting means movable from below to engage said record when the latter is in registering position and to support the same at the center, an arm situated below said record carrying a stylus movable toward and from the axis of said record position, means for rotating said arm and stylus about the axis of the record position, means for moving said stylus from a point where it will clear said record to a point where it will engage the sound track on said record, and means for coordinating the toward movement of the stylus and the rotation of the arm to constrain the stylus to a movement in a spiral identical with the spiral of the sound track of said record, comprising a stationary disc having a spiral groove therein, a follower rotatable with said arm, and movable in said groove, rigid means connecting said follower with said stylus whereby the stylus is constrained to move in a path identical with the sound track on said record, a counter-weight for said stylus, connections between said stylus and said counter-weight comprising a pair of inextensible tapes each travelling in a constrained path, one of said tapes being connected to the stylus and one of them connected to the counter-weight, a sliding block to which the other end of both of said tapes is connected.

6. A sound translating device comprising a member over which a record may be fed horizontally from the side, supporting means movable from below to engage said record when in registering position and to support the same at the center, a transparent cover situated above said record against which said record is pressed by said supporting means, an arm situated below said record carrying a stylus movable toward and from the axis of said record position, means for rotating said arm and stylus about the axis of the record, means for raising said stylus from a point where it will clear said record to a point where it will engage the sound track on said record, and means for coordinating the inward movement of the stylus and the rotation of the arm to constrain the stylus to a movement in a spiral identical with the spiral of the sound track of said record.

7. A sound translating device comprising stationary means for supporting a record in inverted position, a pair of diametrically oppositely extending arms rotatable below said record, a stylus mounted upon one of said arms and movable thereon toward and from the axis of the record, a disc mounted parallel to said record having a spiral groove therein conforming to the spiral sound track of said record, a follower movable on the other of said arms in position to engage said groove in said disc, means for coordinating the movement of said follower and of said stylus whereby said stylus is constrained to follow a path identical with sound record on said disc, and means for moving said stylus and said follower vertically to bring them out of engagement with their respective spirals.

8. A sound translating device comprising stationary means for supporting a record in inverted position, a pair of arms diametrically oppositely extending, rotatable below said record, a stylus mounted upon one of said arms and movable thereon toward and from the center of the record, a disc mounted parallel to said record having a spiral groove therein conforming to the spiral sound track of said record, a follower movable on the other of said arms in position to engage said groove in said disc, means for coordinating the movement of said follower and of said stylus whereby said stylus is constrained to follow a path identical with the sound record on said disc, and means for moving said stylus and said follower vertically to bring them out of engagement with their respective spirals, comprising a head rotatable about the axis of the disc to which said arms are attached, and means for vertically moving said head and disc.

RICHARD G. LEITNER.

REFERENCES CITED

The following references are of record in the file of this patent:

UNITED STATES PATENTS

| Number | Name | Date |
| --- | --- | --- |
| 793,140 | Manwaring | June 27, 1905 |
| 851,311 | Palmer | Apr. 23, 1907 |
| 860,878 | Myers | July 23, 1907 |
| 1,008,605 | MacDonald | Nov. 14, 1911 |
| 1,251,918 | Pratley | Jan. 1, 1918 |
| 1,271,881 | Fletcher | July 9, 1918 |
| 1,462,867 | Meyer | July 24, 1923 |
| 1,495,783 | Fechtenburg et al. | May 27, 1924 |
| 1,630,630 | Nishida | May 31, 1927 |
| 2,224,358 | Quisling | Dec. 10, 1940 |
| 2,257,466 | Howell | Sept. 30, 1941 |
| 2,260,861 | Nystrom | Oct. 28, 1941 |